(12) United States Patent
Franz et al.

(10) Patent No.: US 9,481,574 B2
(45) Date of Patent: Nov. 1, 2016

(54) APPARATUS FOR HCL SYNTHESIS WITH STEAM RAISING

(75) Inventors: Marcus Franz, Schwabmünchen (DE); Sören Götz, Kahl (DE)

(73) Assignee: SGL Carbon SE, Wiesbaden (DE)

( * ) Notice: Subject to any disclaimer, the term of this patent is extended or adjusted under 35 U.S.C. 154(b) by 14 days.

(21) Appl. No.: 13/809,019

(22) PCT Filed: Jun. 22, 2011

(86) PCT No.: PCT/EP2011/060413
§ 371 (c)(1),
(2), (4) Date: Jun. 19, 2013

(87) PCT Pub. No.: WO2012/000859
PCT Pub. Date: Jan. 5, 2012

(65) Prior Publication Data
US 2013/0266485 A1    Oct. 10, 2013

(30) Foreign Application Priority Data

Jul. 1, 2010   (DE) .................. 10 2010 030 832

(51) Int. Cl.
C01B 7/01       (2006.01)
F01K 23/06      (2006.01)
F22B 1/22       (2006.01)
F22B 37/02      (2006.01)

(52) U.S. Cl.
CPC ............. *C01B 7/012* (2013.01); *F01K 23/064* (2013.01); *F22B 1/22* (2013.01); *F22B 37/025* (2013.01); *Y02P 20/124* (2015.11); *Y02P 20/129* (2015.11)

(58) Field of Classification Search
CPC ........................................................ C01B 7/01
USPC .................................................. 422/119, 198
See application file for complete search history.

(56) References Cited

U.S. PATENT DOCUMENTS

| | | | |
|---|---|---|---|
| 1,905,432 A * | 4/1933 | Bauer | C01B 7/01 423/487 |
| 2,126,125 A * | 8/1938 | McIntire et al. | 122/7 R |
| 3,207,131 A * | 9/1965 | Axeman | 122/149 |
| 3,349,558 A * | 10/1967 | Smith | 60/754 |
| 3,750,399 A * | 8/1973 | Moore | 60/670 |
| 4,903,641 A | 2/1990 | Goehl et al. | |
| 5,709,542 A * | 1/1998 | Rentzel et al. | 431/242 |
| 2003/0083453 A1* | 5/2003 | Lukacs et al. | 528/10 |

(Continued)

FOREIGN PATENT DOCUMENTS

| | | |
|---|---|---|
| DE | 857 343 | 11/1952 |
| DE | 2 317 024 A1 | 10/1974 |

(Continued)

OTHER PUBLICATIONS

Machine translation for DE-857343_Jul. 21, 2014.*

*Primary Examiner* — Huy-Tram Nguyen
(74) *Attorney, Agent, or Firm* — Laurence A. Greenberg; Werner H. Stemer; Ralph E. Locher

(57) ABSTRACT

An apparatus for synthesizing hydrogen chloride from chlorine and hydrogen or from chlorine and hydrocarbons with integrated heat recovery. The combustion chamber and the heat exchanger are arranged in the steam drum of a shell boiler that works according to the waste heat boiler principle.

13 Claims, 2 Drawing Sheets

(56) References Cited

U.S. PATENT DOCUMENTS

2003/0183537 A1* 10/2003 Eden et al. ............... 205/775.5
2008/0223315 A1 9/2008 Doland

FOREIGN PATENT DOCUMENTS

DE 33 13 761 A1 11/1983
DE 38 07 264 A1 9/1989

* cited by examiner

APPARATUS FOR HCL SYNTHESIS WITH STEAM RAISING

BACKGROUND OF THE INVENTION

Field of the Invention

The present invention relates to an apparatus for HCL synthesis with steam raising, wherein chlorine and hydrogen or chlorine and hydrocarbons are used as starting materials. If need be, HCL fractions, air or inert components can also be comprised in the starting materials. The synthesis furnace and the heat exchanger incorporated downstream for the product cooling are parts of a steam generator.

Shell boilers are usually used for steam raising with fossil fuels. Moreover, hydrocarbon-containing gases, such as natural gas, or hydrocarbon-containing oil, such as for example heating oil, are for the most part used as the fuel. Firing with solid fuels such as hard coal has also long been known. Combustion temperatures of 700° C. up to a maximum of approx. 1500° C. normally occur here.

It is prior art that heat is also decoupled from hydrogen chloride-containing flue gases by means of a steam generator, but in the case of flame-tube or water-tube boilers under wholly different conditions from those described as follows.

In the first place, the complete reaction of educts is usually brought about with insulated steel combustion chambers lined with refractory material. Therefore, it does not involve a flame-tube boiler in the sense intended here, but rather a boiler incorporated downstream. In addition, the temperature is preferably maintained at a maximum of 1250° C., for example by targeted addition of cooling media, such as for example steam, water or inert gas.

The production of hydrogen chloride from chlorine and hydrogen or hydrogen-containing compounds takes place in cooled synthesis apparatuses, which for example are manufactured from corrosion-resistant materials such as synthetic resin-impregnated graphite. The formed hydrogen chloride gas is then cooled and in most cases absorbed in water in an integrated or downstream absorber, hydrochloric acid thereby being formed.

Chlorine and hydrogen are caused to react in a flame in special combustion chambers. The reaction heat (approx. 92 kJ/mol HCL) is cooled down via the cooled walls of the reaction chamber and by means of integrated or external heat exchangers.

For the purpose of saving energy, it is desirable to use the reaction heat arising in such a process economically, the generation of steam being preferred from the technical standpoint.

Chinese patent specification 93110518.8 describes a circuit variant, wherein the reaction heat is used to generate steam, partly via the wall of the synthesis furnace and partly from the further cooling of the reaction gases. A plurality of heat exchangers must be incorporated upstream for good heat utilization. A heat-conductive and corrosion-resistant coating not described in detail is used as corrosion protection for the synthesis furnace.

In Chinese patent specification no. 2007200968895.9, an apparatus for the generation of hydrogen chloride with steam raising is described, wherein the synthesis furnace is disposed inside a steam boiler. The synthesis furnace is made of graphite. The steam boiler has an external circulation circuit, similar to a natural circulation evaporator. With this apparatus, it is supposed to be possible to generate steam with a pressure of 0.1 to 0.2 MPa.

In patent specification DE 3807264, an apparatus is described which comprises a burner, a combustion chamber and an internal heat exchanger. Pressurized water flows through these components, said pressurized water taking up the reaction heat and releasing its heat in a steam generator located outside the actual incineration plant. The temperature of the coolant circuit is supposed to have temperatures of 170 to 230° C. at pressures of 9 to 27 bar. Saturated steam with at least 7 bar is supposed to be generated with this plant.

The design as a water-tube boiler is expensive and complex (e.g. production tolerances), i.e. cost-intensive, and also has the following drawbacks:

1. Under conditions of use in practice, a non-uniform distribution of the boiling mixture leads to the Leidenfrost effect in the tubes and ultimately, through local overheating of the tube wall, to corrosion and short times in service. This problem exists independently of whether the evaporator is operated with natural circulation or with forced circulation.
2. An embodiment with thermal oil as a heat-transfer medium is problematic. On the one hand, a non-uniform distribution and overheating of the tube wall and of the oil likewise cannot be avoided here, and on the other hand the synthesis plant has to be placed in a tank for environmental reasons.
3. The efficiency of separated heat-transfer circuits for thermal decoupling is always poorer than direct evaporation.
4. The prior art is characterized by insufficient thermal coupling, since the product gas HCl is cooled down to only approx. 1000° C. Valuable energy therefore remains unused.

The prior art, therefore, is thermal decoupling from HCl-containing gases, up to 70% HCl, by means of steam boiler plants incorporated downstream and a temperature of at most 1250° C.

Both measures are necessary to prevent corrosion of the steel steam generator, in particular high-temperature corrosion.

The problem is to provide an apparatus which enables a reliable effective direct evaporation of water, for which purpose the heat of the exothermal reaction of chlorine and hydrogen is decoupled.

BRIEF SUMMARY OF THE INVENTION

This problem is solved by the inventive apparatus for performing a method for hydrogen chloride synthesis from chlorine and hydrogen or from chlorine and hydrocarbons, which operates with an integrated heat recovery.

In the present invention, the flame tube and the combustion chamber are the same apparatus. In addition, an adiabatic combustion temperature of up to 2400° C. can be permitted in the combustion chamber without corrosion occurring at the steam product.

According to the invention, for this purpose a special $H_2$—$Cl_2$ diffusion burner is located concentrically in the provided flame tube.

Both the combustion chamber and the heat exchanger are disposed in the steam drum of a shell boiler, which works according to the waste heat boiler principle.

The combustion chamber according to the invention can preferably be operated with a higher or lower internal pressure compared to the pressure outside the combustion chamber. The combustion chamber is designed such that the HCl synthesis can preferably be operated in a pressure range from 0.1 bar (abs.) to 7.0 bar (abs.), more preferably in a pressure range from 0.8 bar (abs.) to 5.0 bar (abs.), particularly preferably in a pressure range from 0.9 bar (abs.) to 4.0 bar (abs.).

All parts according to the invention that are contacted by hydrogen chloride are always in a temperature range inside which the corrosion is low, because these parts are all located inside the steam drum, which is operated at a temperature level at which the corrosion is low, e.g. even in the case of water vapour-containing mixtures.

The shell boiler preferably comprises a flame tube, reversing chambers and following tube-bundle heat exchangers, which are installed in a boiler body.

Guide elements are particularly preferably located between the boiler wall and the heat exchanger tubes, said guide elements ensuring a uniform circulation of the water in the boiler. Combustion chamber, heat exchanger tubes and guide elements can be disposed in such a way that the circulation of the surrounding water and the rising of the steam are ensured (free convection). A circulatory pump is not required here.

The product cooling tubes can preferably be passed upwards into the steam space, so that overheating (drying) of the generated steam is possible. Overheating of the steam can preferably also be carried out by the fact that steam is generated with a pressure higher than the network pressure and then becomes relieved of pressure in the network.

The combustion chamber and the heat exchanger incorporated downstream for the product cooling are preferably made from a metallic material and are parts of a steam generator.

The combustion chamber and the heat exchanger incorporated downstream for the product cooling are preferably made of steel and are parts of a steam generator.

The main components are preferably disposed vertically, although a horizontal arrangement is in principle also possible.

The combustion chamber, the heat exchanger and the steam drum are preferably disposed eccentrically. Generally, however, an arrangement usual in the trade is preferred.

It is particularly preferable for an HCL synthesis burner to be provided at the mouth opening of the flame tube.

The combustion chamber according to the invention is preferably protected against corrosion with a coating on a silazane base. The useful life of the combustion chamber (flame tube) is thus lengthened considerably.

Furthermore, it is preferable for the combustion chamber to be protected against corrosion by a deposition welding process. Nickel-based alloys or other standard welding compounds with an increased corrosion resistance serve as welding compounds. Nickel itself or tantalum may also be particularly preferred. The latter are applied according to the so-called cladding process, a special deposition welding process.

A further variant for the protection of the combustion chamber is the coating of the same with ceramic protective layers. Surprisingly, they have a beneficial effect on the useful life of the combustion chamber, although they cannot be constituted gas-tight. The reason for this must therefore be the insulating and heat-radiating property of the coating. This ceramic, not absolutely gas-tight coating is particularly preferably applied to previously determined areas particularly subject to temperature loads, in order to on the one hand achieve their overheating and on the other hand to achieve a better thermal load distribution over the whole internal wall of the combustion chamber. Metal oxides, borides and carbides can be used as ceramic coatings. The latter are preferably deposited by plasma spraying. With the latter-mentioned deposition process, however, it is also possible to deposit high-melting metals and metal alloys, in particular those that are resistant in chlorine atmospheres.

Such an effective corrosion protection, but especially one also based on gas-tightness, can of course be achieved if melts are applied on the inner side of components at risk of corrosion. A melt that can be used particularly effectively is for example enamel.

Furthermore, it is preferable for use to be made of steam for heating the boiler space or gas firing for heating the combustion chamber space in order to prevent corrosion.

The operating temperature of the evaporator lies between 170 and 240° C. According to the invention, the HCL product gas is cooled to 200-1200° C., preferably to 200-500° C. and particularly preferably to 250-350° C. Good heat utilization is thus possible.

Compared to external evaporators heated with pressurized water, a high degree of efficiency is possible according to the invention (temperature difference between circuit water and evaporator no longer present) and the plant is therefore much less expensive.

It is particularly preferable for the flame tube to be corrugated, so that the convective heat transfer portion on the side facing the boiler is increased.

Furthermore, it is particularly preferable that the flame direction of the flame tube can be operated from bottom to top and from top to bottom. The other components are to be disposed correspondingly.

According to the invention, the combustion chamber and the heat exchanger can be constituted to pressure-shock resistant, i.e. they withstand pressures that can arise with the addition of arbitrary mixtures of hydrogen and chlorine.

For the commissioning of the apparatus, the latter can be preheated and brought to operating temperature with an auxiliary burner or with steam from the network.

Leakage monitoring can be carried out by measuring the water vapour pressure in the product. The mode of operation of the apparatus according to the invention is safe, since leakages are to be expected only in the direction of the product side. In addition, the leakage can be detected via a drop in pressure in the steam system.

For early detection of critical corrosion rates, a modified corrosion measuring probe is preferably installed in the combustion chamber space in the apparatus according to the invention. The principle of such a probe is that a material identical to the evaporator is caused to corrode in a controlled manner under the prevailing combustion space conditions and a conclusion is drawn as to the progress of the corrosion by means of the change in resistance associated therewith. If required, the combustion chamber is thus overhauled in good time and no unexpected damaging events occur.

The invention is explained in greater detail below with the aid of diagrammatic drawings which are not to scale. In the figures:

DESCRIPTION OF THE INVENTION

Figure 1:
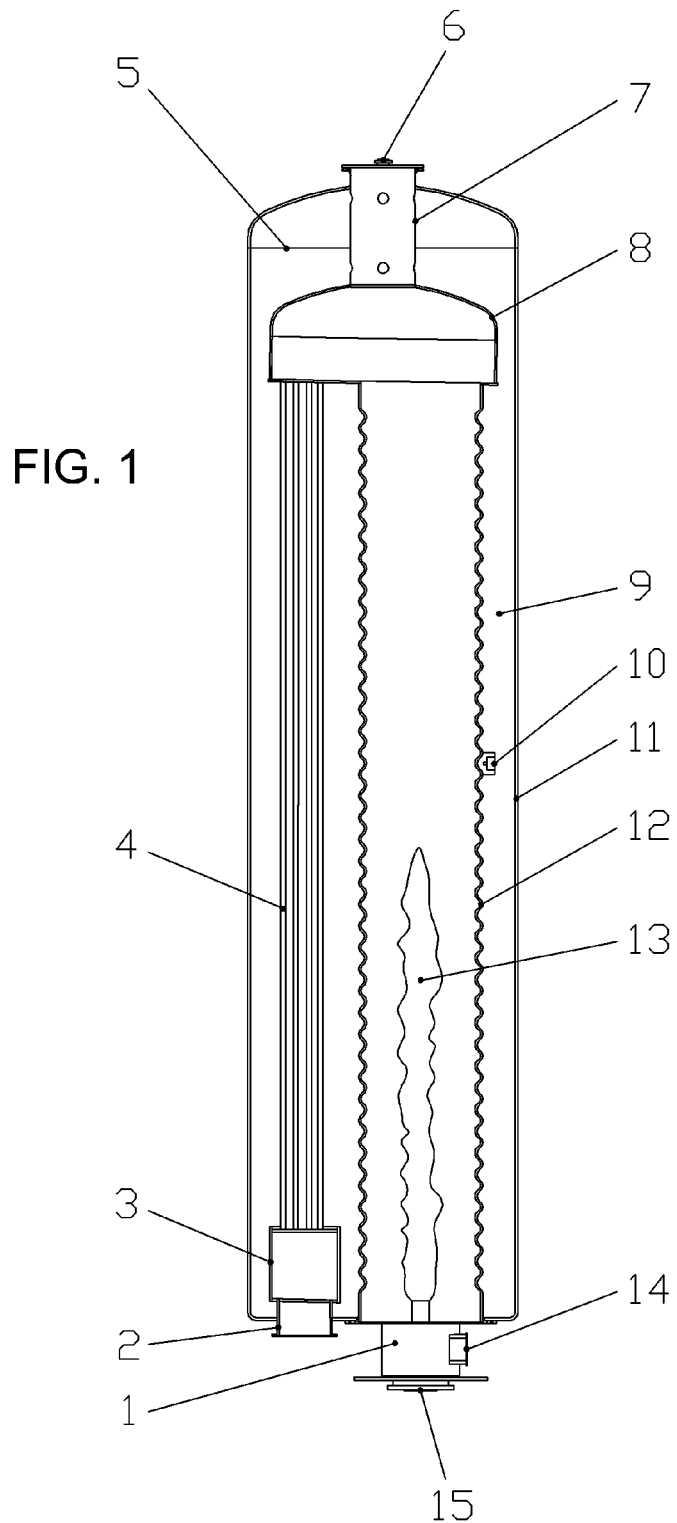
FIG. 1 shows an apparatus for performing the method according to the invention, wherein the reversing chamber of the shell boiler is provided with a following one-sided tube register.

The apparatus for performing the method is a shell boiler which works according to the waste heat boiler principle. The latter comprises a boiler body with an outer shell (11) and an internal flame tube, which surrounds the combustion chamber.

Located at the mouth opening of the flame tube (12) is an HCL synthesis burner (1), which is provided with a gas inlet for hydrogen (14) and a gas inlet (15) for chlorine. The combustion chamber, which for example is made of steel and can be constituted with a corrosion-resistant coating, is preferably bounded by the combustion chamber wall (12). A modified corrosion measuring probe (10) is installed in the combustion space on the combustion chamber wall (12) in the region of the boiler space (9).

Figure 2:
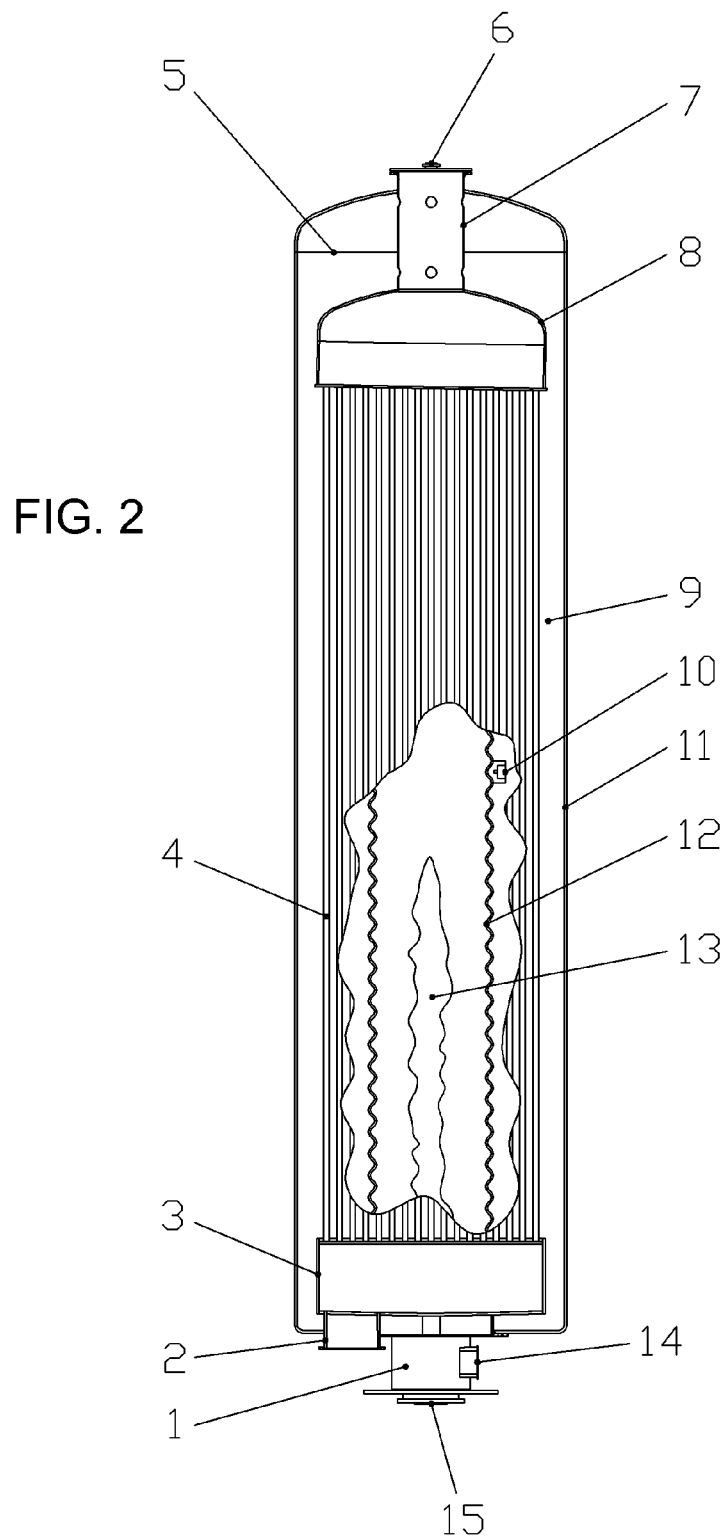
FIG. 2 shows an apparatus for performing the method according to the invention, wherein the reversing chamber of the shell boiler is provided with a following concentric tube register.

The flame direction of the flame (13) is represented from bottom to top. Located above the flame (13) is the reversing chamber (8) with a welded-on steam collecting vessel (7), which is provided with a steam outlet (6). The reversing chamber (8) is completely surrounded by boiler water. The boiler water level (5) is represented. The reversing chamber (8) is provided with a following tube register (4), which can be constituted either one-sided, as shown in FIG. 1, or concentrically, as shown in FIG. 2. The HCl product gas cooled down to 250-280° C. is collected in a following collecting vessel (3) and delivered through the product outlet (2).

The invention claimed is:

1. An apparatus for synthesizing hydrogen chloride from chlorine and hydrogen or from chlorine and hydrocarbons with integrated heat recovery, the apparatus comprising:
    a flame tube, a combustion chamber and a heat exchanger disposed in a steam drum of a shell boiler configured to generate steam therein and to operate according to the waste heat boiler principle, which includes heating a volume of water by combustion of fuels circulating through a tube submerged in the water, said flame tube surrounding the combustion chamber, said flame tube having a HCl synthesis burner being disposed concentrically with said flame tube at a mouth opening of said flame tube, and said combustion chamber being configured for permitting an adiabatic combustion temperature of up to 2400° C.; and
    a reversing chamber disposed above said flame tube, said reversing chamber having a welded-on steam collecting vessel, said steam collecting vessel having a steam outlet.

2. The apparatus according to claim 1, wherein the shell boiler comprises a flame tube or combustion chamber, reversing chambers and following tube-bundle heat exchangers, which are installed in a boiler body.

3. The apparatus according to claim 1, wherein said combustion chamber and said heat exchanger are made from a metallic material.

4. The apparatus according to claim 1, wherein said combustion chamber and said heat exchanger are made of steel.

5. The apparatus according to claim 1, which comprises a coating on a silazane base disposed to protect said combustion chamber against corrosion.

6. The apparatus according to claim 1, wherein the apparatus is configured to cool HCL product gas down to 300-400° C.

7. The apparatus according to claim 6, wherein the apparatus is configured to cool HCL product gas down to 200-300° C.

8. The apparatus according to claim 6, wherein the apparatus is configured to cool HCL product gas down to 250-280° C.

9. The apparatus according to claim 1, wherein said combustion chamber, said heat exchanger and said steam drum are disposed eccentrically.

10. The apparatus according to claim 1, wherein said flame tube is corrugated.

11. The apparatus according to claim 1, wherein said flame tube is configured for selective operation with a flame direction from bottom to top and from top to bottom.

12. The apparatus according to claim 1, which comprises a modified corrosion measuring probe installed in a combustion space of said combustion chamber.

13. The apparatus according to claim 1, wherein said heat exchanger is configured to operate between 170-240° C.

* * * * *